United States Patent [19]

Sutt, Jr. et al.

[11] Patent Number: 5,761,863
[45] Date of Patent: Jun. 9, 1998

[54] METHOD OF REINFORCING A BUILDING

[75] Inventors: Edward G. Sutt, Jr., Winnetka, Ill.;
Timothy A. Reinhold, Clemson, S.C.

[73] Assignee: Clemson University, Clemson, S.C.

[21] Appl. No.: 758,081

[22] Filed: Nov. 27, 1996

[51] Int. Cl.$^6$ ........................................... E04B 5/00
[52] U.S. Cl. ........................... 52/272; 52/92.2; 52/656.9;
248/300; 248/200.1; 403/231; 403/403
[58] Field of Search .................... 52/92.2, 656.9,
52/272, 93.2, 23, 93.1, 282.3, 282.1, 242;
403/231, 403; 248/300, 220.1

[56] References Cited

U.S. PATENT DOCUMENTS

| | | |
|---|---|---|
| 573,452 | 12/1896 | Delahunt. |
| 919,896 | 4/1909 | Lemke ............................ 248/300 X |
| 2,104,872 | 1/1938 | Levy. |
| 2,118,218 | 5/1938 | McLaughlin, Jr.. |
| 2,143,288 | 1/1939 | Stolz. |
| 3,289,362 | 12/1966 | Whelan .............................. 52/92.2 |
| 3,616,587 | 11/1971 | Schlafly, Jr. ...................... 52/287.1 |
| 3,686,812 | 8/1972 | Rensch. |
| 3,883,999 | 5/1975 | Nicoll, Jr.. |
| 3,921,355 | 11/1975 | Pennecot. |
| 4,291,510 | 9/1981 | Sivachenko. |
| 4,321,776 | 3/1982 | Delight. |
| 5,233,801 | 8/1993 | Wolff. |
| 5,491,935 | 2/1996 | Coxum. |
| 5,497,591 | 3/1996 | Nelson .............................. 52/93.1 X |

*Primary Examiner*—Creighton Smith
*Attorney, Agent, or Firm*—Dority & Manning, P.A.

[57] ABSTRACT

The present invention is directed to structural molding members and to a structural molding system designed to retroactively connect together walls, the roof, floors, and the foundation of a preexisting house or building. The structural members are for reinforcing a building so that all external forces applied to the building are transferred to the foundation. The structural molding members are particularly useful for preventing damage to the building when the building is exposed to high winds and seismic activity. In general, the structural molding members include a support bracket that is mounted directly to the exterior surfaces of a building and connected to internal frame components. The support bracket can then be covered with a molding member, a light fixture, or the like to provide an aesthetic appeal to the reinforcing structure.

27 Claims, 11 Drawing Sheets

METHOD OF REINFORCING A BUILDING

FIELD OF THE INVENTION

The present invention is generally directed to a method for reinforcing a building. More particularly, the present invention is directed to the use of structural molding members to reinforce adjoining frame components of a preexisting building. For instance, in one embodiment, the structural molding members can be used to reinforce the connection between a roof overhang and a wall of a residential home in order to protect the home against strong winds and seismic activity.

BACKGROUND OF THE INVENTION

In view of the destruction and damage caused by recent hurricanes and earthquakes, it has become evident that many buildings and existing residential housing are not built and constructed to withstand these types of natural catastrophes. In fact, windstorms inflict more damage on residential housing and commercial buildings than any other natural hazard. Existing buildings, especially those located in hurricane prone coastal areas and in close proximity to fault lines, are in need of being retroactively reinforced to prevent damage when exposed to environmental forces.

Perhaps the weakest link in the structural system of buildings is the attachment between the roof and the walls. For instance, during severe wind storms, wind loads have a tendency to exert uplift forces on the roof. If the roof to wall connection is not sufficiently strong to withstand these forces, the roof can separate from the walls. The walls are then left unbraced and unsupported at the top and can collapse under horizontal wind loads. Complete building failure thus results.

In seismic events, the roof structure provides diaphragm action which stabilizes the walls and distributes horizonal forces generated by the seismic activity into wall shears. If the roof to wall connection is inadequate for the lateral forces generated by the ground motion, the roof separates from the walls and significant damage occurs to the building.

Currently, for wood frame buildings, the roof is typically connected to the wall only by toenailing a rafter or truss of the roof to a top plate that rest upon vertical wood studs contained within the walls. When subjected to external forces, this connection can separate between the roof and the top plate or between the top plate and the wall studs resulting in severe damage to the building as described above. In view of these weaknesses, others in the past have attempted to devise a stronger and more durable connection between the roof to a wall.

For instance, Simpson Strong-Tie Company, Inc. of Oakland, Calif. markets a product line of metal plates and straps designed to reinforce wood to wood connections and wood to concrete connections in buildings. The plates and straps, which are primarily used only for new building constructions, are mounted directly to the frame work of the building.

In U.S. Pat. No. 573,452 to Delahunt a means for rigidly connecting together different parts of a building is disclosed. The connecting means generally includes a rod having separate adjustably-connected parts. The parts are connected together by a turn buckle. Opposite ends of the rod are adapted to engage separate parts of the building. When the ends of the rod are secured to the building, the turn buckle is used to tighten the connection.

Other prior art devices are disclosed in U.S. Pat. No. 2,118,218 to McLaughlin, Jr., in U.S. Pat. No. 2,104,872 to Levy, and in U.S. Pat. No. 4,321,776 to Delight.

The prior art constructions, however, are designed primarily for use during the construction of a new building. Further, the devices are designed to be attached directly to the frame work of the building. Thus, in order to install these devices in a preexisting building, the interior finished surfaces of the building must be removed to gain access to the roof and frame components. This process requires significant labor, is very cost prohibitive, and creates a large disturbance. Consequently, due to the lack of economical and practical retrofit solutions, retrofitting existing buildings with reinforcement structures is not currently being performed to any large extent.

Thus, a need exists for a method and a system for retroactively reinforcing preexisting buildings. Specifically, a need exists for reinforcement structures for a building that can be installed without having to disrupt or remove interior and exterior finished surfaces. A need also exists for a system of reinforced connections that create a continuous load path for transferring external forces exerted on a building from the roof, down the walls, and to the foundation. Also needed is an improved method for attaching a roof to the walls of a building.

SUMMARY OF THE INVENTION

The present invention is generally directed to a system for reinforcing a building in order to make the building more resistant to externally applied forces, such as those created by winds and seismic events. Accordingly, it is an object of the present invention to provide an improved method and system for reinforcing a building.

It is another object of the present invention to provide a method and system for retroactively reinforcing a preexisting building.

Still another object of the present invention is to provide a method and system for reinforcing a building that transfers forces applied to the building from the roof to the foundation.

Another object of the present invention is to provide structural molding members that are mounted to the exterior surfaces of a building wall and are used to strengthen and reinforce connections between adjoining frame components of a building.

It is another object of the present invention to provide structural molding members that transfer loads between non-aligned frame members of a building.

Still another object of the present invention is to provide a reinforced connection between a roof and a wall of a building.

These and other objectives of the present invention are achieved by providing a reinforced connection between a wall of a building and an adjoining frame component, wherein the frame component can be a roof, a foundation or a floor. The reinforced connection includes a wall having an exterior surface and determined length. A frame component adjoins the wall and includes at least one support structure which intersects a plane parallel to the wall. According to the present invention, the reinforced connection further includes a support bracket which has a first section that is connected to the support structure of the frame component. The support bracket also includes a second section connected to the wall. In particular, the second section is positioned adjacent to the exterior surface of the wall. Once attached, the support bracket secures the wall to the frame component and provides a reinforced connection.

In one embodiment, the frame component can be a roof structure having a plurality of support beams adjoining the wall. The wall, on the other hand, can include a plurality of load bearing studs. The support bracket is positioned adjacent to the exterior surfaces of the roof and the wall and is connected to the support beams and to the load bearing studs. A molding member can be attached to the support bracket for hiding the bracket from view.

Securing members, such as lag screws, can be used to connect the support bracket to the wall and to the frame component. The support bracket can include an angular portion configured to receive the securing members and to insert them into the wall at an angle equal to or less than 90°, and particularly between about 45° to about 75°. Alternatively, the securing members, instead of being directly connected to the wall, can extend down through the wall and be attached near the base of the wall or,to the foundation of the building. This embodiment is particularly preferred when the wall is constructed of individual cement blocks or bricks.

When the frame component is a floor, a pair of support brackets can be used. For instance, one bracket can be connected to the upper surface of the floor and to the wall above the floor, while a second bracket can be used to connect the wall below the floor to a lower surface of the floor.

These and other objects are also achieved by providing a method for securing a wall of a building to a frame component, wherein the frame component is a roof, a foundation or a floor. The frame component can include at least one support structure which intersects a plane parallel to the wall.

The method includes the steps of securing a first section of a support bracket to the wall. Specifically, the support bracket is mounted to an exterior surface of the wall. A second section of the support bracket is then secured to the support structure of the frame component for providing a reinforced connection. Preferably, once installed, the support bracket is covered with a molding member, a heating unit, a light fixture or the like.

The present invention is also directed to a support bracket for securing a wall of a building to either a roof, a floor or a foundation. The support bracket includes a substantially flat end section defining a plurality of openings for receiving securing members used to connect the support bracket to a frame of the building. A substantially flat wall section is attached to the end section at a lateral side thereof. In this embodiment, the wall section has a length substantially equal to the width of a wall to which the support bracket is to be mounted. The wall section is configured to rest adjacent to a finished surface of the wall.

The support bracket further includes an angular section protruding from the wall section. The angular section defines a plurality of openings for receiving securing members used to secure the support bracket to the wall. The angular section is configured to insert the securing members into the wall at an angle less than 90°, particularly at an angle between about 45° to about 75°, and more particularly at an angle between about 65° to about 70°.

By using multiple support brackets as described above, the present invention is also directed to a system for reinforcing a building. The system includes a plurality of reinforced connections located at preselected locations on the building for transferring external forces applied to the building to the foundation.

Each of the reinforced connections includes a wall having an exterior surface, a frame component adjoining the wall, and a support bracket mounted to the exterior surface of the wall. The support bracket is attached to the wall and the frame component for securing the frame component to the wall.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
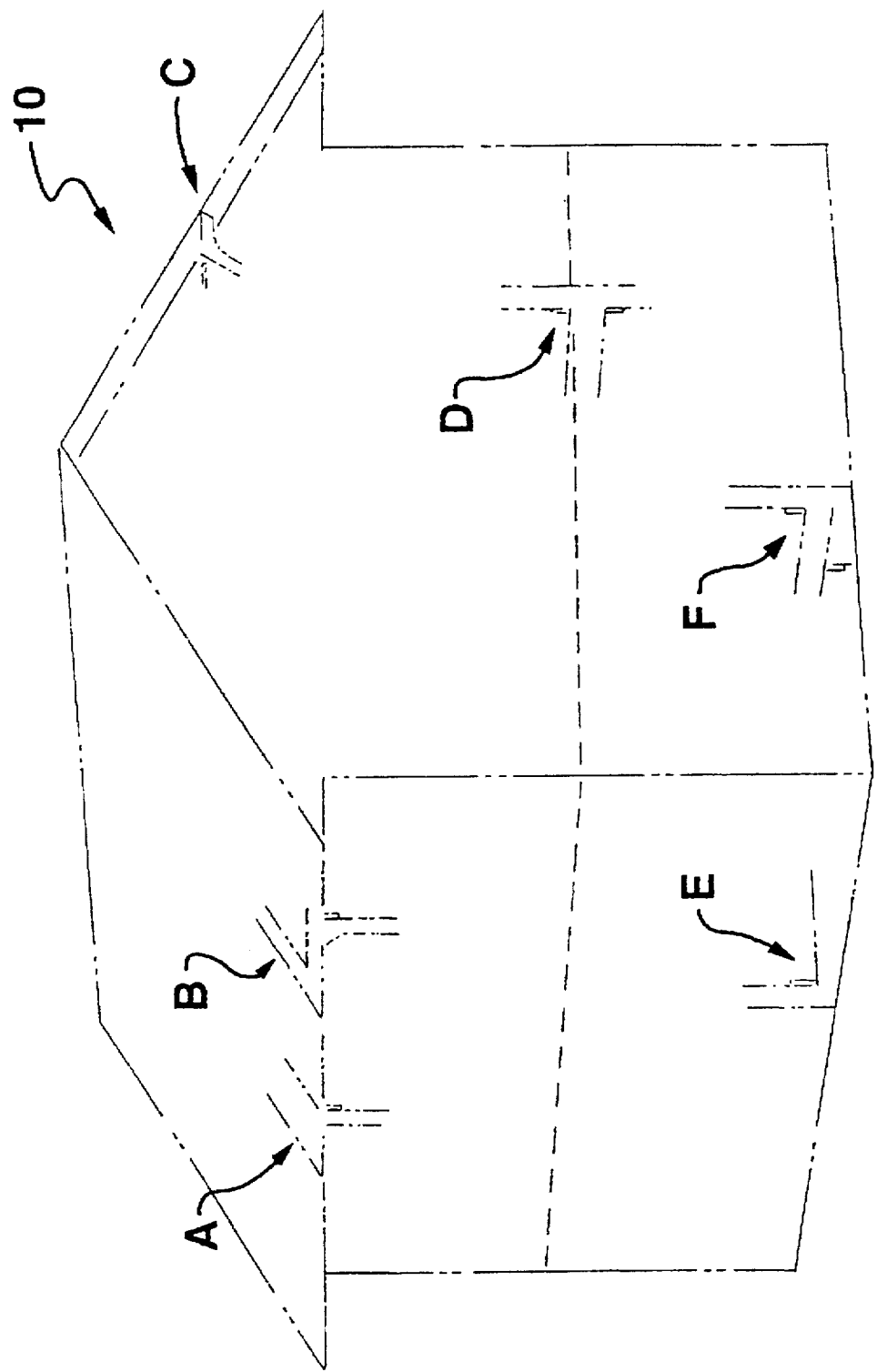
FIG. 1 is a perspective view of a building incorporating various reinforced connections made in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiment only, and is not intended as limiting the broader aspects of the present invention, which broader aspects are embodied in the exemplary construction.

The present invention is generally directed to structural molding members and to a structural molding system designed to retroactively connect together walls, the roof, floors and the foundation of a preexisting house or building. The structural members are for reinforcing the building so that all external forces applied to the building are transferred to the foundation. The structural members are for preventing damage to the building structure when the building is exposed to high winds and seismic activity.

One important feature of the present invention is that the structural molding members are mounted directly to the exterior surfaces of the walls of the building. Thus, the building can be reinforced without having to remove or disturb the finished surfaces of the building in order to gain access to the frame components of the building. Further, it has been discovered that the structural molding members of the present invention actually create a stronger connection between adjoining parts of a building than many prior art constructions and methods. Thus, the structural molding members are also well suited for use in new building constructions.

Referring to FIG. 1, a building generally 10 is shown illustrating some of the possible locations where the structural molding members of the present invention may be installed. Specifically, the structural members can be used to construct a wall to rafter connection generally A, a wall to truss connection generally B, a wall to a gable end rake overhang connection generally C, a wall to floor connection generally D, a wall to foundation connection generally E, and a floor to a wall of a foundation connection generally F. Through this system, not only is the connection between each component of the building reinforced, but also the connections work in concert transferring external forces applied to the building from the roof down to the foundation.

As stated above, perhaps the part of a building or home that is the most susceptible to damage when exposed to high winds or seismic activity is the roof to wall connection. Various embodiments of reinforcing the roof to wall connection in accordance with the present invention are illustrated in FIGS. 2, 3, 5 and 6. For example, referring to FIG. 2, wall to rafter connection A as presented in FIG. 1 is shown in more detail.

As shown, a roof 10 is supported, in part, by a wall 12. Roof 10 is made from a framework of parallel rafters, such as rafter 14. Attached to the top of rafter 14 is a roof sheathing 16, which is bordered on the side by a fascia 18. Attached to the bottom of rafter 14 on the exterior of the building is a soffit 20, while on the interior of the building is a ceiling sheet 22 made from, for instance, a sheet of drywall.

Wall 12, on the other hand, is constructed from a plurality of upright and vertical wall studs such as wall stud 24. Attached to the top of wall stud 24 are a pair of top plates 26 which transfer the weight of roof 10 onto the wall studs. Attached to wall stud 24 facing the interior of the building is an exterior covering such as a sheet of dry wall 28. On the opposite side of wall 12 facing the outside of the building is an exterior sheathing 30 covered, for instance, by vinyl or wood siding.

Figure 2:
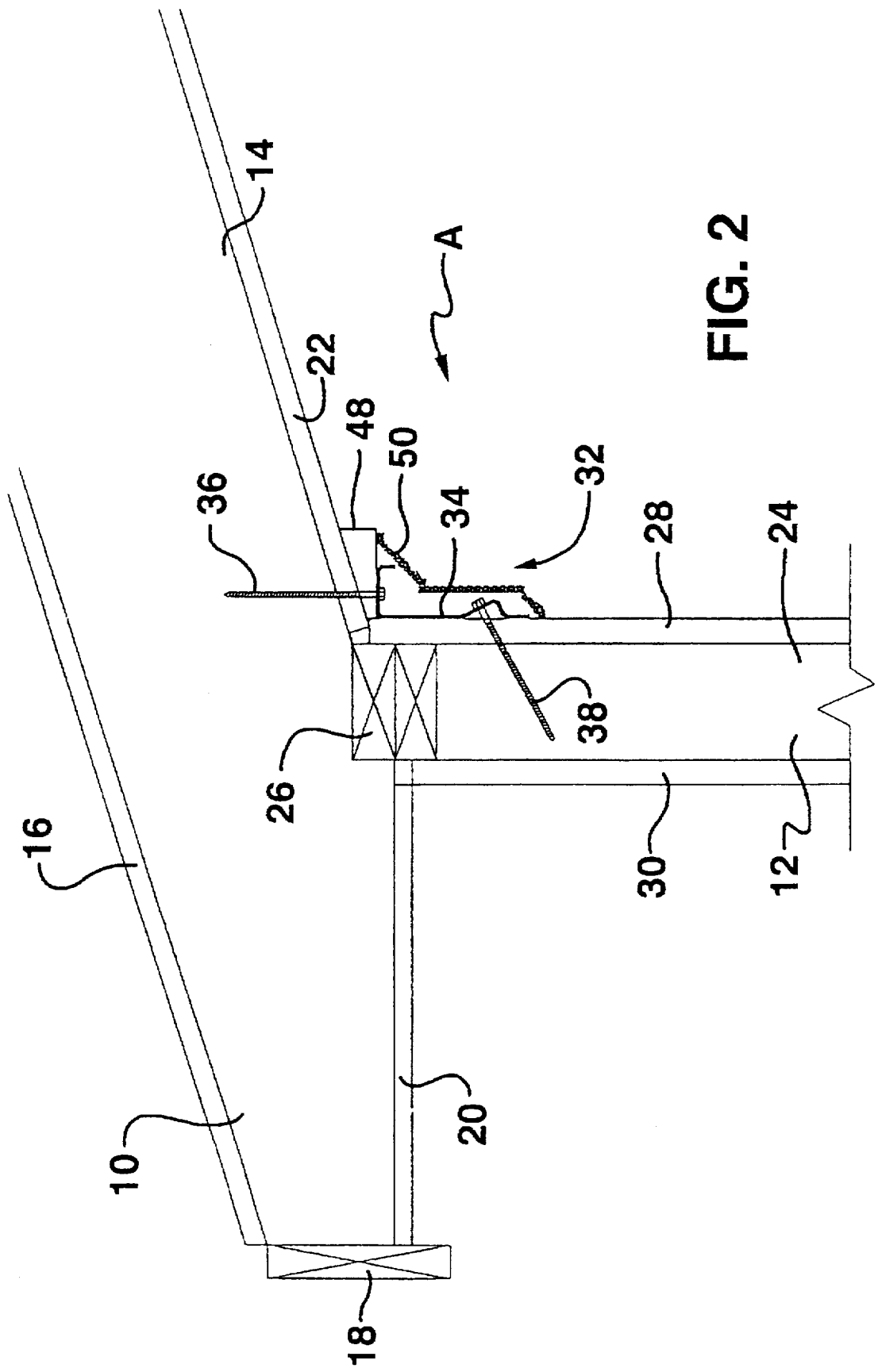
FIG. 2 is a cross-section view of one embodiment of a reinforced roof to wall connection made in accordance with the present invention.

In the embodiment illustrated in FIG. 2, roof 10 and wall 12 form a cathedral ceiling in an interior room of the building. Roof 10 also forms an overhang on the exterior of the building. During wind storms, wind has a tendency to create uplift forces on the roof sheathing 16 as well as push upwards on soffit 20. Under severe conditions, these uplift forces can cause roof 10 to separate from wall 12.

According to the present invention, in order to reinforce wall to rafter connection A, a structural molding member generally 32 is placed on the exterior finished surfaces of the wall and ceiling for connecting wall 12 to roof 10. Structural molding member 32, which can extend the entire length of the wall, includes a support bracket 34 which is attached directly to rafter 14 and wall stud 24. By directly tieing the rafters of roof 10 to the wall studs 24 of wall 12, structural molding member 32 transfers forces applied to the building from the roof into the wall.

In the embodiment illustrated in FIG. 2, support bracket 34 is connected to rafter 14 and wall stud 24 by a pair of securing members, such as lag screws 36 and 38. Lag screws 36 and 38 can be, for instance, four inches long with a ⅜ inch diameter. The lag screws are screwed directly into the wood frame components of the building. In an alternative embodiment, however, an adhesive, such as an epoxy, can be used to secure the lag screws to the wood beams. For instance, holes can be drilled into the rafters and the wall studs. The holes can be filled with an epoxy prior to inserting lag screws 36 and 38.

Figure 3:
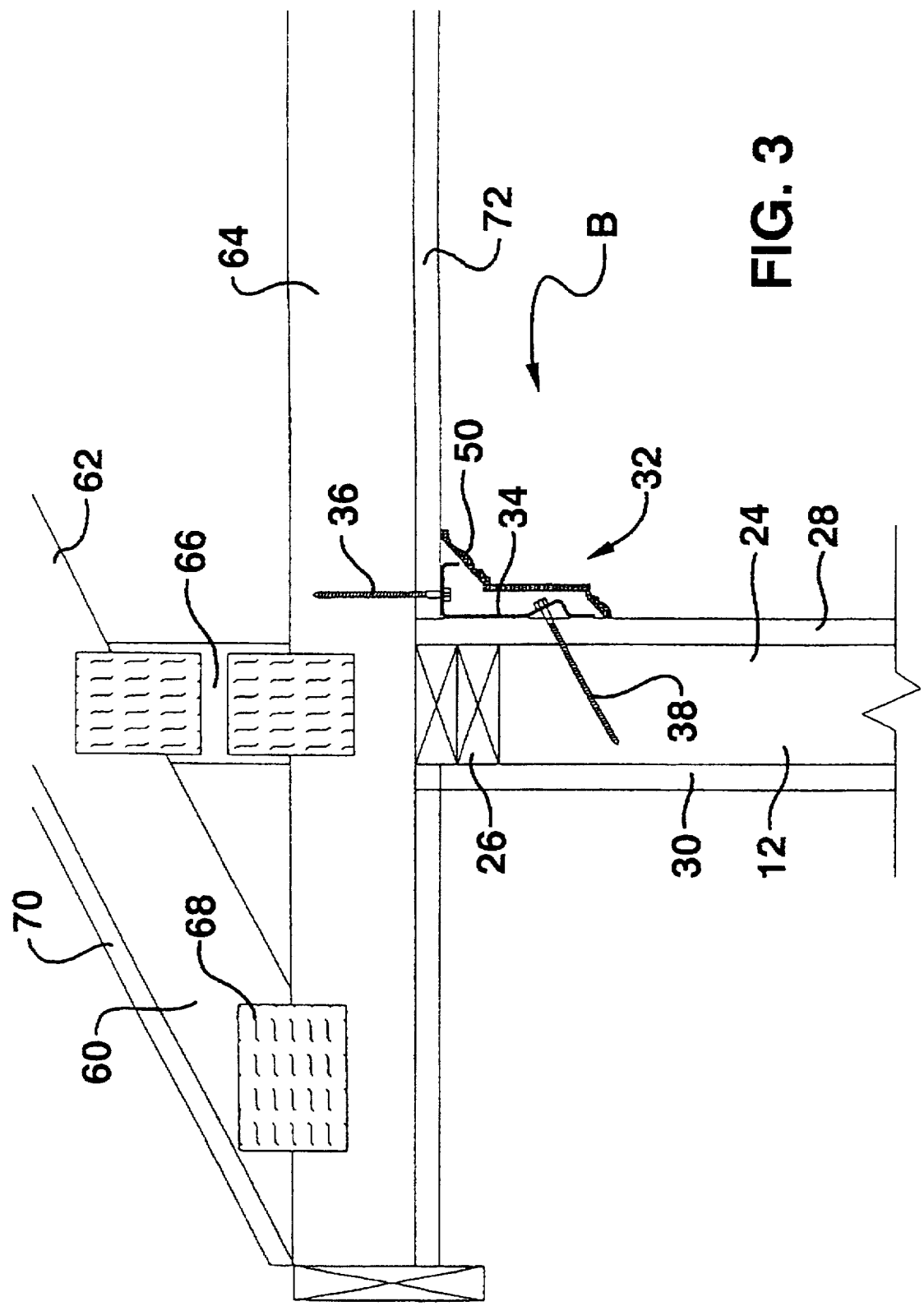
FIG. 3 is a cross-sectional view of an alternative embodiment of a roof to wall connection made in accordance with the present invention.
Figure 4:
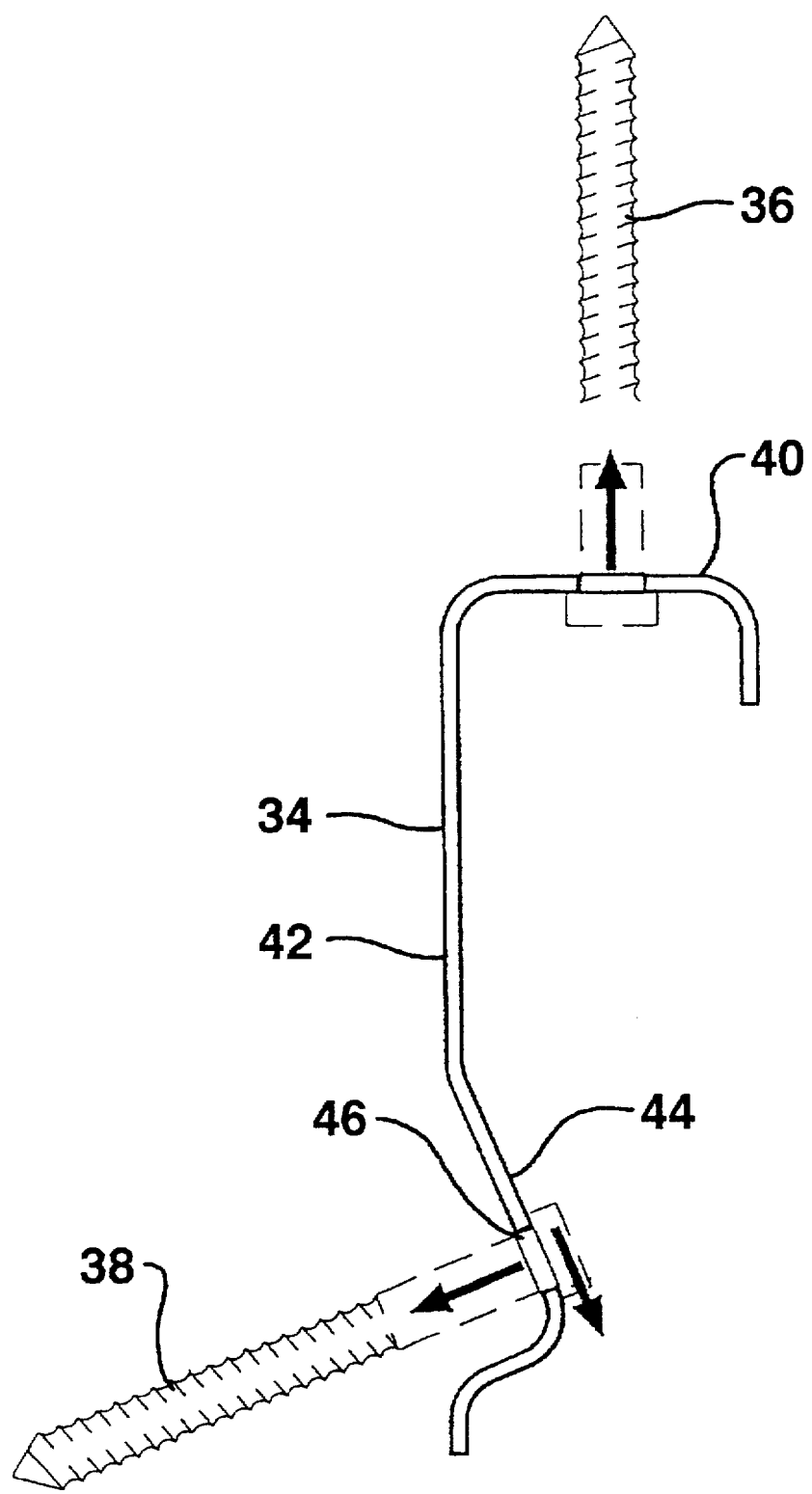
FIG. 4 is a cross-sectional view of one embodiment of a support bracket for reinforcing connections between components of a building.

Referring to FIG. 4, an enlarged view of support bracket 34 is shown. Support bracket 34, in this embodiment, includes a substantially flat end section 40 and a substantially flat wall section 42. End section 40 and wall section 42 are adapted to lay adjacent to a finished surface of a building. For instance, as shown in FIG. 3, end section 40 can lay against a ceiling while wall section 42 can lay against an adjoining wall.

Wall section 42 includes an angular section 44 defining an opening 46 for receiving lag screw 38. Angular section 44 is configured to insert lag screw 38 into a wall stud or other frame component at an angle less than 90° in either direction, and particularly between about 45° to about 75°. Angular section 44 can be integral with wall section 42 as shown in the figure or can be made from a separate piece such as a wedge-shaped member. By inserting lag screws into the building at an angle, a stronger connection occurs.

In an alternative embodiment, support bracket 34 as shown in FIG. 4 can have an additional section connecting end section 40 with wall section 42. In this embodiment, support bracket 34 would have a triangular-shaped cross section. By enclosing the bracket in this manner, the bracket may exhibit more strength in some applications.

Figure 7:
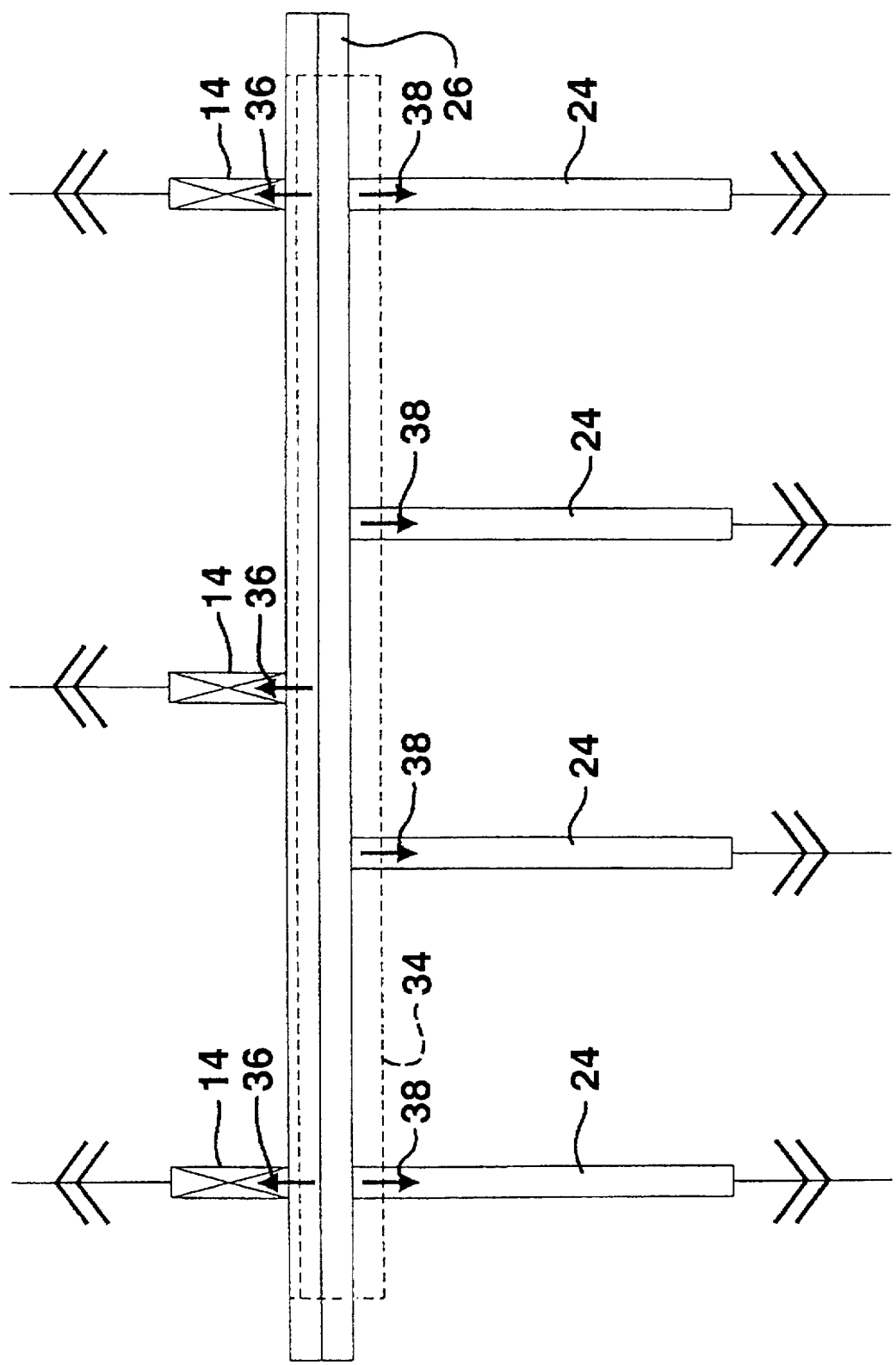
FIG. 7 is a front elevational view of the support bracket illustrated in FIG. 4 shown connecting a wall to a roof of a building.

Preferably, support bracket 34 of structural molding member 32 extends the entire length of wall 12. Referring to FIG. 7, a front elevational view of support bracket 34 shown in phantom is illustrated connecting rafters 14 of roof 10 to wall studs 24 of wall 12.

As shown in FIG. 7, typically the rafters of a roof of a building are spaced a different distance apart than the walls studs contained in an adjoining wall. For instance, rafters are usually spaced 24 inches apart, while wall studs are usually spaced 16 inches apart. Support bracket 34 of the present invention, however, is configured to compensate for any nonalignment and for the differences in spacing by extending along a substantial length of the wall. Thus, even when a particular rafter is not in alignment with a wall stud, loads are still transferred from the rafter 14 into wall 12. In fact, through the use of support bracket 34, all of the rafters 14 are interconnected with each and every wall stud 24 for forming a consolidated reinforcement. Most prior art straps and devices, on the other hand, are only adapted to connect a single rafter with a single wall stud.

Referring back to FIG. 2, as described above, in this embodiment, roof 10 forms a cathedral ceiling with wall 12. Consequently, a filler block 48 is included adjacent to ceiling sheet 22 for providing a flat surface against which support bracket 34 may rest. In an alternative embodiment, however, support bracket 34 can be configured to conform directly against ceiling sheet 22.

Once support bracket 34 is secured to wall 12 and to roof 10, the bracket can be covered by a molding, a light fixture, a heating unit, or the like in order to provide further aesthetic or functional benefits to the building. Alternatively, the support bracket itself can have an aesthetic outer shape or can be integral with a light fixture, heating unit or the like. In FIG. 2, support bracket 34 is covered by a crown molding member 50. Crown molding member 50, which can be made, for instance, from wood or plastic, can be secured to support bracket 34 in any suitable manner. Crown molding 50 not only hides support bracket 34 from view, but also provides additional visual appeal to the room of the building.

The structural molding members of the present invention have been found to be very effective at reinforcing the connection between two adjoining frame members of a building, especially the connection between a roof to a wall. It has been estimated that rafter or roof truss to wall connections in a typical two story building exposed to 90 mph winds will be subjected to wind loads of from about 590 pounds of force to about 1400 pounds of force depending upon whether the building is shielded by trees or other buildings or whether the building is located adjacent to a large body of water. Prior art straps used to reinforce buildings are only rated for withstanding from about 169 pounds of force to about 940 pounds of force per connection.

The structural molding member of the present invention, on the other hand, will withstand in many applications over 3000 pounds of force per connection and would be rated at 1000 pounds per connection. Thus, the structure molding members of the present invention are not only well adapted for retroactively reinforcing buildings but also provide strength benefits and installation advantages not before realized by prior art constructions.

Figure 5:
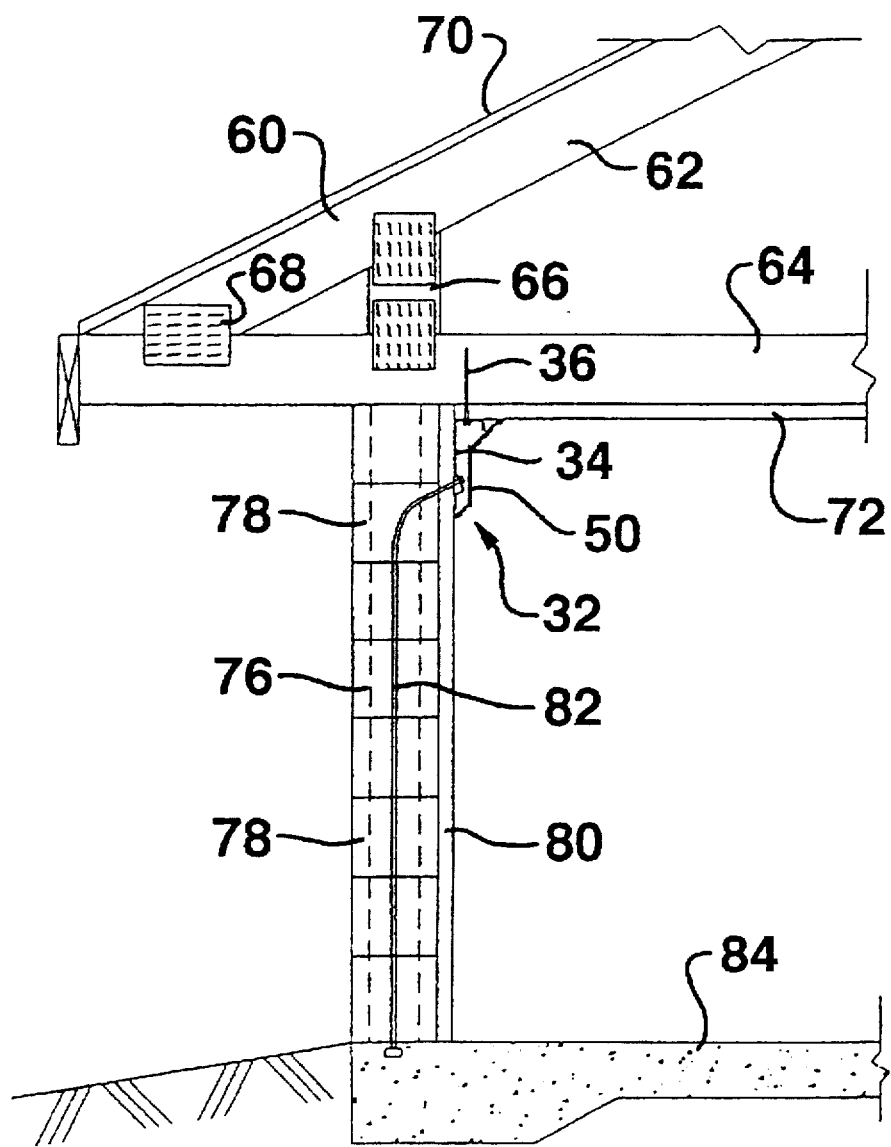
FIG. 5 is a cross-sectional view of still another embodiment of a reinforced roof to wall connection made in accordance with the present invention.
Figure 6:
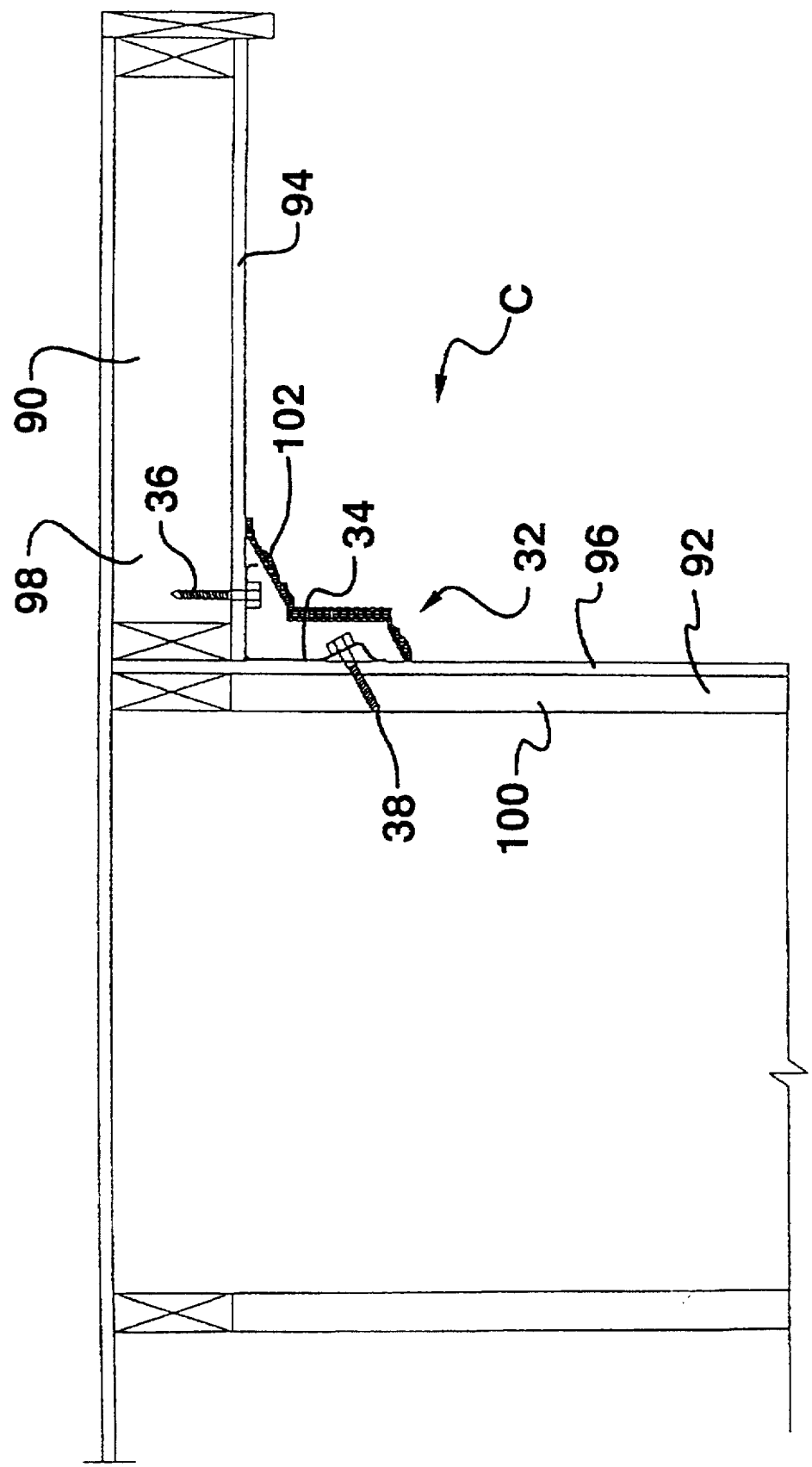
FIG. 6 is a further embodiment of a reinforced roof to wall connection made in accordance with the present invention.

Referring to FIGS. 3, 5 and 6, other embodiments of reinforced roof to wall connections made with structural molding members according to the present invention are illustrated. FIG. 3 for instance, illustrates a reinforced connection B of a truss 60 to wall 12. Truss 60 is constructed of a plurality of parallel truss units which include a roof beam 62 connected to a truss chord 64 by truss plates 66 and 68. Attached to the exterior of roof beam 62 is a roof sheathing 70. Attached to truss chord 64 on the inside of the building is a sheet of dry wall 72 forming a ceiling.

In this embodiment, in accordance with the present invention, support bracket 34 of structural molding member 32 is attached to wall stud 24 and to truss chord 64 by securing members 36 and 38 which can be, for instance, lag screws. Support bracket 34 provides a secure connection between truss 60 and wall 12. Further, to provide aesthetic appeal, support bracket 34 is covered by crown molding 50.

Referring to FIG. 5, another embodiment of a reinforced truss to wall connection is illustrated. As shown, truss 60 is supported on a wall 76. In this embodiment, wall 76 is constructed of cement blocks 78. On the inside of the building, cement blocks 78 are covered by a finished interior surface 80.

Similar to the embodiments illustrated in FIGS. 2 and 3, support bracket 34 of structural molding member 32 is connected to truss chord 64 by securing member 36. In this embodiment, however, instead of being attached to wall 76, support bracket 34 includes a securing member 82 which runs down through wall 76 and is anchored to a foundation 84. Although support bracket 34 may be attached to cement block 78, a stronger reinforcement is created if the bracket is instead attached directly to foundation 84.

It has been discovered that if support bracket 34 were attached to a single cement block, the cement block may break away from wall 76 when subjected to various loads. Thus, a much more secure connection is formed if truss 60 is attached directly to foundation 84 or anchored by grout into the bottom cement block when wall 76 is made from individual cement blocks.

FIG. 6 illustrates in more detail wall to gable end rake overhang connection C illustrated in FIG. 1. As shown, structural molding member 32 can also be mounted on the exterior of a building in order to reinforce the connection between a roof to a wall. In this embodiment, support bracket 34 of structural molding member 32 is used to connect a rake end overhang 90 of a roof to a wall 92. Support bracket 34 is mounted directly to a soffit 94 and to the exterior siding 96 of the building. More particularly, support bracket 34 is connected to a cripple beam 98 of rake end overhang 90 and to a truss beam 100 of wall 92 by securing members 36 and 38. In this embodiment, instead of a crown molding member, support bracket 34 is covered by an exterior molding member 102. Molding member 102 can be made from a material and with a design that matches the outside siding of the building.

Figure 8:
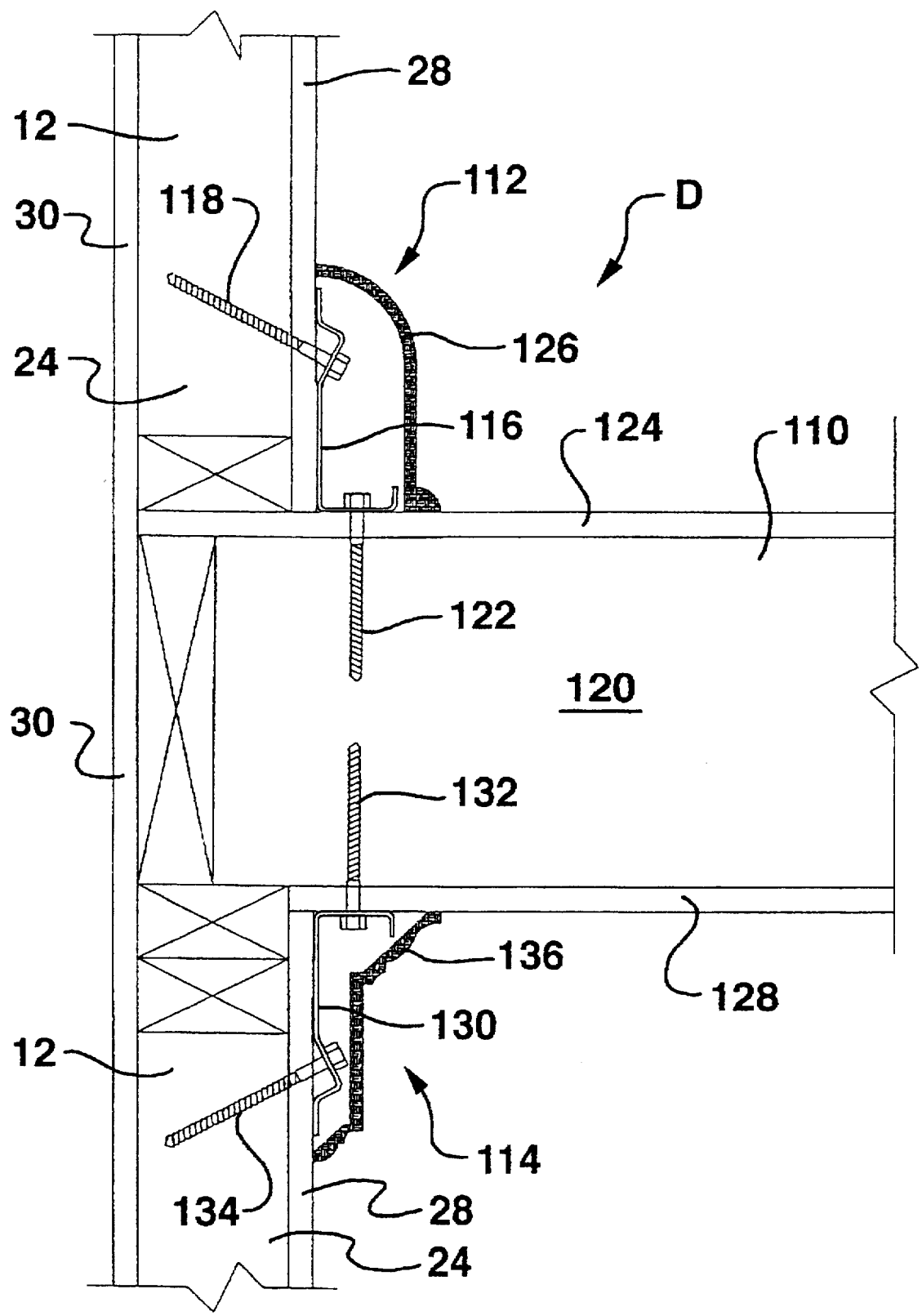
FIG. 8 is a cross-section view of one embodiment of a floor to wall connection made in accordance with the present invention.
Figure 9:
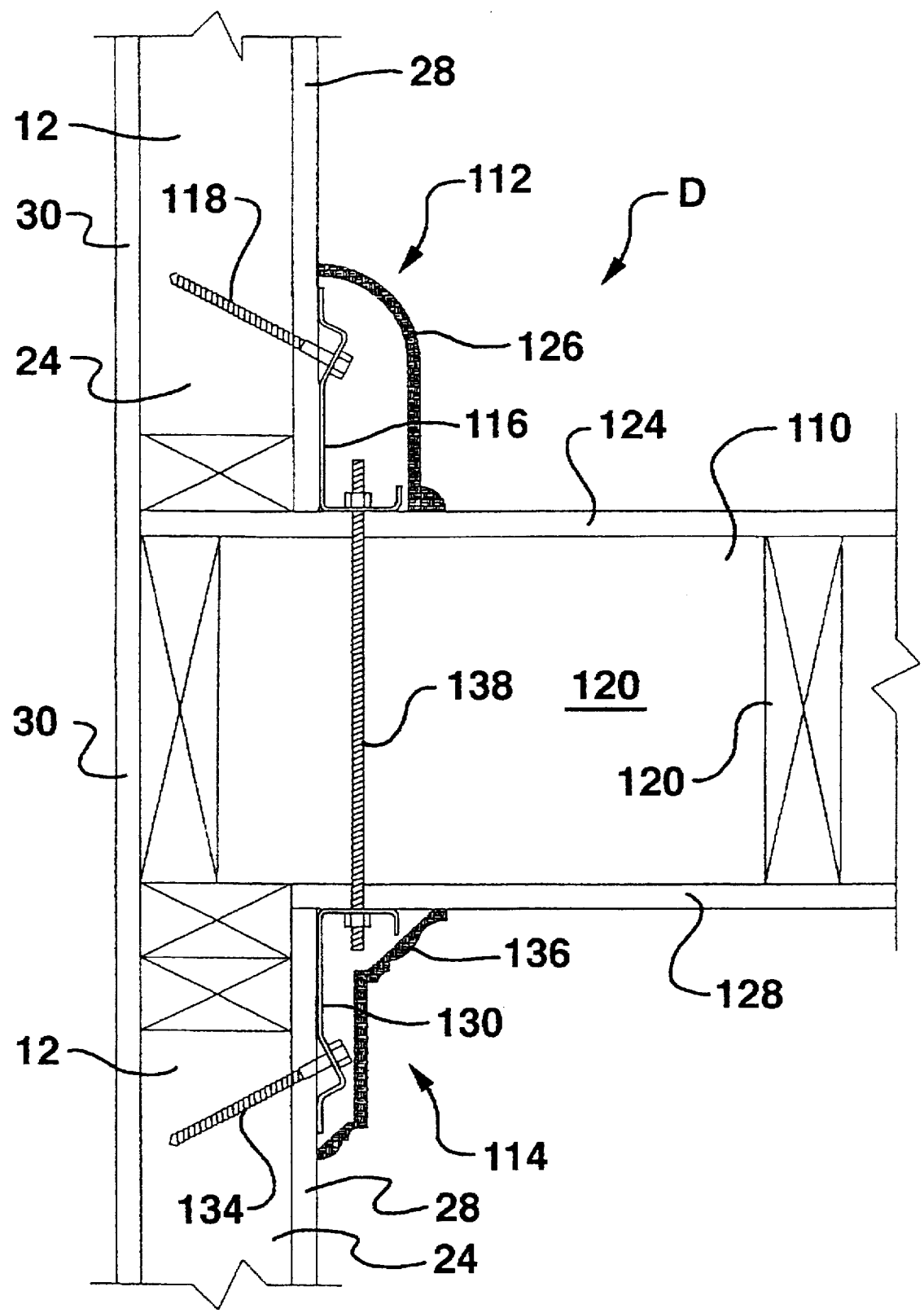
FIG. 9 is a cross-sectional view of an alternative embodiment of a floor to wall connection made in accordance with the present invention.

Besides reinforcing a wall to roof connection, the structural molding members of the present invention can also be used to reinforce floor to wall connections as shown in FIGS. 8 and 9. FIGS. 8 and 9 illustrate two embodiments of wall to floor connection D as illustrated in FIG. 1. As shown in both Figures, wall 12 is connected to the top and to the bottom of a floor 110 using a structural molding member 112 at the top and a structural molding member 114 at the bottom. Floor 110 separates two stories of a building.

Referring to FIG. 8, structural molding member 112 includes a support bracket 116 connected to wall stud 24 of wall 12 by a securing member 118. Support bracket 116 is also connected to a floor beam 120 of floor 110 by a securing member 122. Support bracket 116 is mounted directly to the surface of dry wall 28 and to a flooring surface 124, which is attached to floor beam 120. Support bracket 116 is covered, in this example, by a base board member 126.

Structural molding member 114, on the other hand, is mounted below floor 110 to a ceiling 128. Structural molding member 114 includes a support bracket 130 which is connected to floor beam 120 by a securing member 132 and to wall stud 24 of wall 12 by a securing member 134. Support bracket 130 is covered by a crown molding member 136.

Through the use of structural molding members 112 and 114, loads applied to the exterior of the building are transferred down wall 12 through floor 110. As stated above, ultimately the loads are transferred into the foundation of the building.

The connection illustrated in FIG. 9 is also constructed to transfer loads through floor 110. FIG. 9, however, is designed to be used when floor beam 120 as shown in FIG. 8 does not run perpendicular to wall 12 and therefore can not be used for securing support brackets 116 and 130. Instead, a securing member such as a threaded rod or cable 138 is used to connect support bracket 116 directly to support bracket 130.

Completing the load path involves connecting the walls to the foundation. Although foundations can be constructed in different manners, the structural molding member of the present invention is adapted to be used in all different situations and applications. One application is illustrated in FIG. 10.

Figure 10:
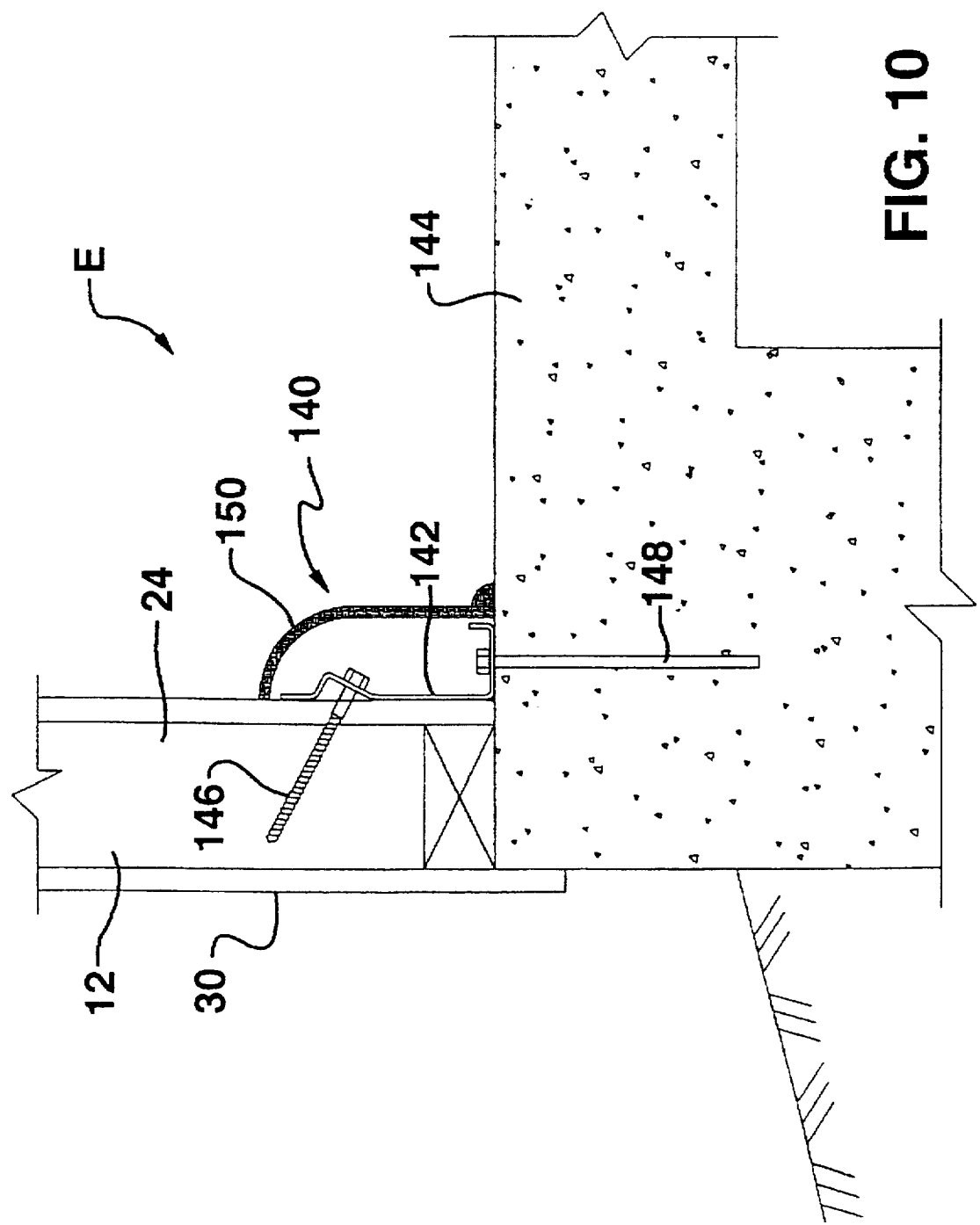
FIG. 10 is a cross-sectional view of one embodiment of a reinforced wall to foundation connection made in accordance with the present invention.

Referring to FIG. 10, wall to foundation connection E is illustrated including a structural molding member 140. Structural molding member 140 includes a support bracket 142 connecting wall 12 to a foundation 144. In particular, support bracket 142 is connected to wall stud 24 of wall 12 by a securing member 146. Support bracket 142 is connected to foundation 144, on the other hand, by a securing member 148 which can be, for instance, an anchor bolt. Support bracket 142 is covered by a base board member 150.

Figure 11:
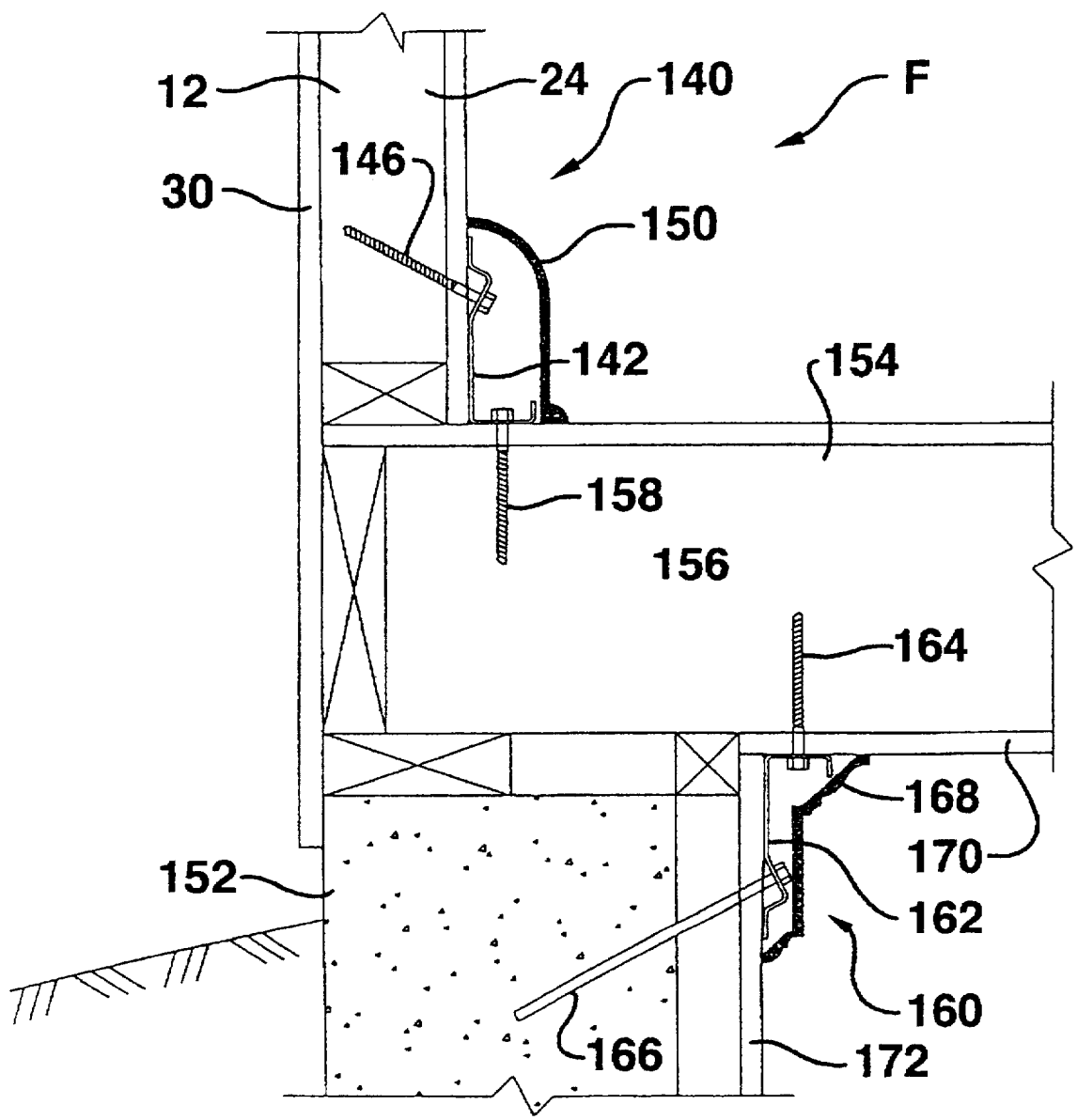
FIG. 11 is a cross-sectional view of a wall to floor connection and of a connection between a floor and a wall of a foundation made in accordance with the present invention.

Referring to FIG. 11, another embodiment for transferring the loads to a foundation according to the present invention is illustrated. Specifically, connection F illustrated in FIG. 11 represents a manner of transferring loads to a foundation 152 when the building includes a basement area or crawl space. The structural molding members of the present invention are used to transfer loads from wall 12 to a floor 154 and from floor 154 to foundation 152.

The first connection in FIG. 11 is for connecting wall 12 to floor 154 using structural molding member 140. Structural molding member 140 includes a support bracket 142 which is attached to wall stud 24 by a securing member 146. Support bracket 142 is also connected to a floor beam 156 by a securing member 158. As shown, support bracket 142 is covered by a baseboard member 150.

Floor 154 is also connected to foundation 152 by a second structural molding member generally 160. Structural molding member 160 includes a support bracket 162 which is attached to floor beam 156 by a securing member 164 and to foundation 152 by a securing member 166. Support bracket 162 is covered by a crown molding member 168. Support bracket 162 is mounted directly to a ceiling sheet 170 and a sheet of dry wall 172.

In general, the support brackets and structural molding members of the present invention can be made from any suitable material. For instance, the structural molding members can be made from a metal such as steel or from a structural plastic material. Any material may be used that will provide a reinforced connection strong enough to withstand external forces applied to the building.

As illustrated in the figures, the structural molding members of the present invention can be installed at various preselected locations of a building. When installed throughout the building, the structural molding members aid in transferring forces exerted on the building from the roof and walls to the foundation. Although the figures illustrate many intended uses of the structural molding members of the present invention, the figures are not exhaustive of the different locations or types of building constructions in which the structural molding members may be installed. Further, although various securing members were described and illustrated, any suitable means of attachment may be used to secure the structural molding members to the frame components of the building.

It is also to be understood that even though the primary focus of the examples contained in the above description is directed to wood construction, the structural molding members of the present invention are equally applicable to cement and block construction. It is believed that the structural molding members can even be used with and attached to metal framework if desired.

The present invention may be better understood with reference to the following examples.

EXAMPLE 1

Various tests were conducted in order to evaluate the performance of lag screws as they would be used with the structural molding members of the present invention. Specifically, the angle in which the lag screws would be inserted into a frame component were evaluated. The performance of using an epoxy to bond the screws to a frame component was also compared to the performance of non-bonded fasteners.

A total of six different test series were conducted. Three-eighths inch by four inch lag screws were inserted into a wood beam at angles of 68°, 45° and 90°. The lag screws were inserted into the wood beam using a flat metal strap that included an angular portion into which the lag bolts were inserted. A ½ inch sheet of drywall was placed in between the metal strap and the wood beam.

In some of the examples, the lag screws were bonded to the wood beam using an epoxy. When an epoxy was used, a ¾ inch hole was drilled into the wood and filled with epoxy. The lag screw was then inserted into the epoxy and the epoxy was cured.

In preliminary testing, the distance the lag screw was spaced from the end of the beam was varied. This initial testing indicated that shear capacity of the connection increased the farther the screw was installed away from the end of the wood member.

In standard stud construction, most codes require the use of two 16d nails to attach the stud to the top plate. In most cases these nails are driven through the top plate and penetrate about two inches into the top of the stud. Thus, all testing was performed with the center of the lag screw placed 2 ¼ inches from the top of the stud. When installing a support bracket according to the present invention, this configuration would avoid interaction with the nails, would space the lag screws away from the end of the stud, but would keep the size of the support bracket to a minimum.

Once the metal strap was secured to the wood beam, the opposite end of the wood beam was attached to the base of a Universal test machine. A jaw gripped the metal strap of the sample while the universal test machine applied a load. A crosshead speed of either 0.1 inches per minute or 1 inch per minute was used until failure. When failure occurred, the ultimate load was recorded. A total of 64 tests were conducted. The following results were obtained.

TABLE 1

| Lag Screw Testing Results | | | | | | |
|---|---|---|---|---|---|---|
| Data Series | 1 | 2 | 3 | 4 | 5 | 6 |
| No. of Tests | 24 | 14 | 11 | 2 | 11 | 2 |
| Angle of Screws | 68 deg | 68 deg | 45 deg | 45 deg | 90 deg | 90 deg |
| Epoxy | Yes | No | Yes | No | Yes | No |
| Rate of Test (in/min.) | 0.1 | 0.1 | 0.1 | 0.1 | 1.0 | 0.1 |
| Mean Ultimate Load at Failure (lbs. of force) | 3350 | 2938 | 3820 | 2585 | 2165 | 2440 |

Generally, the best results were obtained when the bolt angle was either 68° or 45°. A 68° angle, however, may facilitate field installation. As also shown above, using an epoxy to secure the lag screw generally increased the strength of the connection.

EXAMPLE 2

The support bracket illustrated in FIG. 4 was tested on a wall section that had a length of approximately four feet. The wall section was constructed according to standard wood frame construction details. Specifically, the wall included four vertical wall studs spaced 16 inches apart. The walls studs were attached to two top plate beams. Three rafters spaced 24 inches apart were placed on the top plates. The rafters were not connected to the top plates in order to solely evaluate the strength of the support bracket of the present invention. Sheets of ½ inch drywall were connected to the rafters and to the wall studs.

Several 60 inch long support brackets as shown in FIG. 4 were constructed out of ⅛ inch steel. The support brackets were each attached to a separate wall specimen using ⅜ inch by 4 inch lag screws. No epoxy was used in securing the lag screws to the wall studs and to the rafters.

The whole assembly was then fastened to the bottom of a Universal testing machine. Loads were applied to the rafters until failure occurred. In some of the specimens, the rafters were permitted to rotate about the support bracket. In other tests, on the other hand, no rotation was permitted which would more closely resemble actual conditions present in a building. The loads were applied to the specimens using a crosshead speed of 0.1 inches per minute. In some of the specimens, a washer was placed between the head of the lag screw and the support bracket. A summary of the results are as follows:

TABLE 2

Summary of Bracket Testing Results

| Test No. | Ultimate Load Until Failure (lbs. of force) | Rotation | Washers |
| --- | --- | --- | --- |
| 1 | 8660 | No | No |
| 2 | 9000 | No | Yes |
| 3 | 7810 | Yes | Yes |
| 4 | 8000 | No | Yes |
| 5 | 8500 | Yes | No |
| 6 | 11060 | No | Yes |
| 7 | 11210 | No | Yes |

In test numbers 6 and 7, the test was performed by cycling the sample to 3,000 pounds ten times before loading to failure.

During a typical test, it was difficult to observe any change in the bracket shape until a total force of about 4000 pounds was applied to the system. At that time, the bracket began to assume a deflected shape. From observation, it appeared that the top ⅓ of the bracket underwent the majority of the bending as there was no observable deflection along the bottom edge of the bracket.

At a total load of approximately 5000 pounds, the top of the bracket began to roll up and continued to roll until failure occurred. When washers were not installed, it was observed that there was significant local deflection around the lag screws that attached the bracket to the rafters. Of the seven tests performed, an average of 3059 pounds of force was applied to each rafter at failure.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A reinforced connection of a wall of a building to an adjoining frame component, wherein said frame component is a roof, a foundation or a floor, said reinforced connection comprising:

a wall having an exterior surface and a determined length;

a frame component adjoining said wall, said frame component including at least one support structure, said at least one support structure intersecting a plane parallel to said wall; and a support bracket including a first section and a second section, said first section being connected by securing members to said at least one support structure of said frame component, said second section being positioned adjacent to said exterior surface of said wall and extending along at least a portion of the length of said wall, said second section being connected by securing members to said wall thereby securing said wall to said frame component, said second section of said support bracket including an angular portion that receives said securing members, said angular portion being configured to insert said securing members into said wall at an angle less than 90°.

2. A reinforced connection as defined in claim 1, wherein said frame component is a roof and said at least one support structure comprises a plurality of support beams.

3. A reinforced connection as defined in claim 2, wherein said wall includes a plurality of load bearing studs adjoining said plurality of support beams, at least certain of said load bearing studs not being aligned with a corresponding support beam, said support bracket being attached to each of said load bearing studs and to each of said support beams for transferring loads therebetween.

4. A reinforced connection as defined in claim 1, further comprising a molding member attached to said support bracket.

5. A reinforced connection as defined in claim 1, wherein said angular portion is configured to insert said securing members into said wall at a angle between about 45° to about 75°.

6. A reinforced connection as defined in claim 1, wherein said support bracket is secured to said wall by a plurality of securing members, at least one of said securing members extending down through said wall and being attached to a foundation.

7. A reinforced connection of a wall of a building to a floor comprising:

a wall having an exterior surface and a determined length;

a floor adjoining said wall, said floor including at least one support structure, said at least one support structure intersecting a plane parallel to said wall, said floor having an upper surface and a lower surface; and a first support bracket mounted between said wall and said upper surface of said floor and a second support bracket mounted between said wall and said lower surface of said floor, each of said support brackets including a first section and a second section, each of said first sections being held against said floor by securing members, said second sections of each support bracket being positioned adjacent to said exterior surface of said wall and extending along at least a portion of the length of said wall, said second sections being connected by securing members to said wall.

8. A reinforced connection as defined in claim 7, further comprising securing members that extend through said floor and connect said first support bracket with said second support bracket.

9. A reinforced roof to wall connection for a building comprising:

a wall comprising a plurality of upright load bearing studs attached to an outer covering, said outer covering defining an exterior surface of said wall;

a roof structure at least partially supported by said wall, said roof structure including a plurality of support beams, said support beams intersecting a plane parallel to said wall; and a support bracket extending along the length of said exterior surface of said wall, said support bracket including a first section laying adjacent to an exterior surface of said roof structure and a second section laying adjacent to said exterior surface of said wall, said support bracket being attached to said load bearing studs and to said support beams by a plurality of securing members thereby securing said roof structure to said wall, said second section of said support bracket including an angular portion that receives said securing members, said angular portion being configured to insert said securing members into said load bearing studs at an angle less than 90°.

10. A reinforced roof to wall connection as defined in claim 9, further comprising a molding member attached to said support bracket, said molding member being a member selected from the group consisting of a crown molding, a light fixture and a heater.

11. A reinforced roof to wall connection as defined in claim 9, wherein said angular portion of said second section of said support bracket is configured to insert said securing members into said load bearing studs at an angle between about 45° to about 75°.

12. A reinforced roof to wall connection as defined in claim 11, wherein said securing members comprise lag screws.

13. A support bracket for securing a wall of a building to either a roof, a floor or a foundation of said building, said support bracket comprising:

a substantially flat end section defining a plurality of openings, said openings receiving securing members that are adapted to connect said support bracket to a frame of a building;

a substantially flat wall section attached to said end section at a lateral side thereof, said wall section having a length adapted to extend along at least a portion of the width of said wall to which said support bracket is to be mounted, said wall section adapted to be configured to rest adjacent to said wall; and an angular section protruding from said wall section, said angular section defining a plurality of openings, said openings receiving securing members that secure are intended to be secured said support bracket to said wall, said angular section being configured to insert said securing members into said wall at an angle less than 90°.

14. A support bracket as defined in claim 13, wherein said angular section is configured to insert said securing members into said wall at an angle between about 45° to about 75°.

15. A support bracket as defined in claim 13, wherein said angular section is configured to insert said securing members into said wall at an angle between about 65° to about 70°.

16. A support bracket as defined in claim 13, further comprising a molding member covering said end section and said wall section.

17. A system of reinforcing a building, said system comprising:

a plurality of reinforced connections located at preselected locations on said building that transfer external forces applied to the building to a foundation of said building, said reinforced connections comprising:

a) a wall having an exterior surface and containing a plurality of load bearing studs;

b) a frame component adjoining said wall, wherein said frame component is a roof, a foundation or a floor, said frame component including at least one support structure which intersects a plane parallel to said wall; and c) a support bracket mounted to said exterior surface of said wall, said support bracket being attached to said load bearing studs of said wall by a plurality of securing members and to said at least one support structure of said frame component by a plurality of securing members thereby securing said frame component to said wall, said support bracket including a first section laying adjacent to an exterior surface of said frame component and a second section laying adjacent to said exterior surface of said wall, said second section including an angular portion that receives said securing members, said angular portion being configured to insert said securing members into said wall at an angle less than 90°.

18. A system as defined in claim 17, wherein said reinforced connections further comprise a molding member covering said support bracket.

19. A system as defined in claim 17, wherein said support bracket extends along the entire length of said wall.

20. A reinforced connection for strengthening the attachment of adjoining components in a building, said reinforced connection comprising:

a wall having a first finished surface and a determined length, said wall containing a plurality of load bearing members;

a second finished surface adjoining said wall, said second finished surface covering at least one support structure;

a decorative support bracket including a first section and a second section, said first section being positioned adjacent to said first finished surface of said wall and extending along at least a portion of the length of said wall, said first section being connected to said load bearing members by a first set of securing members, said second section being positioned adjacent to said second finished surface, said second section being connected to said at least one support structure by a second set of securing members.

21. A reinforced connection as defined in claim 20, wherein said second finished surface is a floor.

22. A reinforced connection as defined in claim 20, wherein said second finished surface comprises a ceiling.

23. A reinforced connection as defined in claim 20, wherein said second finished surface is part of a roof overhang.

24. A reinforced connection as defined in claim 20, wherein said support bracket further comprises a molding member covering said first section and said second section.

25. A reinforced connection as defined in claim 20, wherein said at least one support structure comprises a plurality of support beams.

26. A reinforced connection as defined in claim 20, wherein said first section of said support bracket includes an angular portion that receives said first set of securing members, said angular portion being configured to insert said securing members into said load bearing members at an angle less than 90°.

27. A reinforced connection as defined in claim 26, wherein said angular portion is configured to insert said first set of securing members into said load bearing members at an angle between about 45° to about 75°.

* * * * *

UNITED STATES PATENT AND TRADEMARK OFFICE
CERTIFICATE OF CORRECTION

PATENT NO. : 5,761,863
DATED : June 9, 1998
INVENTOR(S) : Edward G. Sutt, Jr. and Timothy A. Reinhold It is certified that error appears in the above-identified patent and that said Letters Patent is hereby corrected as shown below:

Column 1,
Line 42, "top plate that rest upon vertical" should read -- top plate that rests upon vertical --.

Column 13,
Line 42, "that secure are" should read -- that are --.
Line 43, "intended to be secured" should read -- intended to secure --.

Signed and Sealed this

Ninth Day of May, 2006

JON W. DUDAS
*Director of the United States Patent and Trademark Office*